United States Patent
Emelko

[11] Patent Number: 5,903,231
[45] Date of Patent: May 11, 1999

[54] SYSTEM FOR ENCODING BASE N DATA USING A MULTI-LEVEL CODING SCHEME

[75] Inventor: Glenn A. Emelko, Willoughby, Ohio

[73] Assignee: Vidicast Ltd., Mentor, Ohio

[21] Appl. No.: 08/767,371

[22] Filed: Dec. 16, 1996

[51] Int. Cl.⁶ ...................................................... H03M 7/34
[52] U.S. Cl. ............................................... 341/56; 341/57
[58] Field of Search ........................................ 341/56, 57

[56] References Cited

U.S. PATENT DOCUMENTS

| | | |
|---|---|---|
| 3,634,855 | 1/1972 | Miller .......................................... 341/56 |
| 3,743,767 | 7/1973 | Bitzer et al. . |
| 3,984,624 | 10/1976 | Waggener . |
| 4,183,054 | 1/1980 | Patisaul et al. . |
| 4,244,051 | 1/1981 | Fujikura ..................................... 341/57 |
| 4,484,328 | 11/1984 | Schlafly . |
| 4,538,174 | 8/1985 | Gargini et al. . |
| 4,556,973 | 12/1985 | Uemura . |
| 4,626,913 | 12/1986 | Gurumurthy . |
| 4,665,431 | 5/1987 | Cooper . |
| 4,750,036 | 6/1988 | Martinez . |
| 4,789,895 | 12/1988 | Mustafa et al. . |
| 4,800,428 | 1/1989 | Johanndeiter et al. . |
| 4,805,020 | 2/1989 | Greenberg . |
| 4,807,031 | 2/1989 | Broughton et al. . |
| 4,910,750 | 3/1990 | Fisher ......................................... 341/57 |
| 4,920,503 | 4/1990 | Cook . |
| 4,958,230 | 9/1990 | Jonnalagadda et al. . |
| 4,969,041 | 11/1990 | O'Grady et al. . |
| 5,014,125 | 5/1991 | Pocock et al. . |
| 5,063,446 | 11/1991 | Gibson . |
| 5,075,773 | 12/1991 | Pullen et al. . |
| 5,177,604 | 1/1993 | Martinez . |
| 5,191,330 | 3/1993 | Fisher et al. ............................... 341/56 |
| 5,200,822 | 4/1993 | Bronfin et al. . |
| 5,243,423 | 9/1993 | DeJean et al. . |
| 5,251,301 | 10/1993 | Cook . |
| 5,327,237 | 7/1994 | Gerdes et al. . |
| 5,387,941 | 2/1995 | Montgomery et al. . |
| 5,410,360 | 4/1995 | Montgomery . |
| 5,452,009 | 9/1995 | Citta . |

FOREIGN PATENT DOCUMENTS

| | | |
|---|---|---|
| 0 490 504 | 6/1992 | European Pat. Off. . |
| 7310645 | 2/1975 | Netherlands .................... H04L 25/48 |
| WO 94/09578 | 4/1994 | WIPO ............................. H04L 7/027 |
| WO 96/26607 | 8/1996 | WIPO ............................... H04N 7/03 |

*Primary Examiner*—Howard L. Williams
*Attorney, Agent, or Firm*—Benesch, Friedlander, Coplan & Aronoff LLP

[57] ABSTRACT

A system for encoding data by converting an input value into one of a plurality of voltage levels. The multi-level encoding system allows for increased data transfer rates and conservation of bandwidth, and provides self-synchronization for decoding.

15 Claims, 7 Drawing Sheets

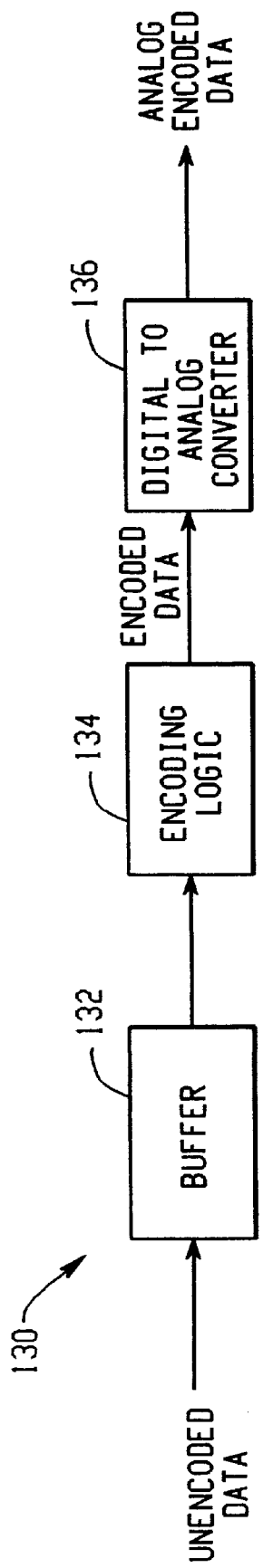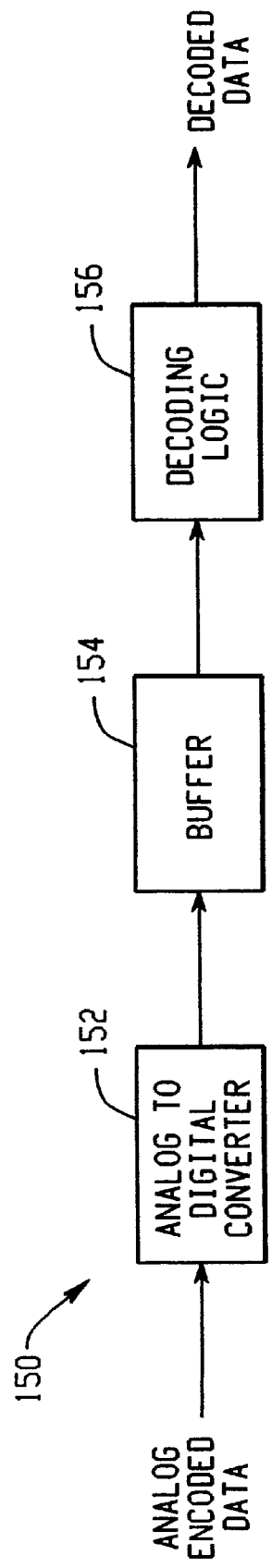

SYSTEM FOR ENCODING BASE N DATA USING A MULTI-LEVEL CODING SCHEME

FIELD OF THE INVENTION

The present invention relates generally to a system for encoding data. More particularly, the present invention relates to a system for encoding data which allows higher data transmission rates and conserves bandwidth, and provides self-synchronization.

BACKGROUND OF THE INVENTION

Prior art data encoding methods for encoding digital information have used two voltage levels, where each voltage level represents a single bit. In this respect, a first voltage level represents a digital value "0," while a second voltage level represents a digital value "1." As a result, a set of eight of these voltage levels is needed to encode one byte of digital data. Data bytes are encoded into changing voltages and decoded back into bytes. This is done by using a commonly available electronic device which is generically referred to as a UART (Universal Asyncronous Receiver Transmitter) or an ACIA (Asyncronous Communications Interface Adapter). UARTs convert parallel data (usually eight-bit words) to a serial data stream for transmission over a single wire cable and simultaneously convert a received serial bit stream to parallel words. The serial data stream is comprised of a signal having two voltage levels, one representing a digital "0," the other representing a digital "1."

In many cases, the data rate achievable by UARTs and ACIAs is insufficient for the desired application. In order to achieve greater data rates for high-speed communications, data has been encoded into complex waveforms such as tones, which are then phase, frequency and amplitude modulated. For instance, data has been encoded using RF (Radio Frequency) modulation, QAM (Quadrature Amplitude Modulation), ASK (Amplitude Shift Keying), PSK (Phase Shift Keying), FSK (Frequency Shift Keying), TCM (Trellis Coded Modulation) and QPSK (Quadrature Phase Shift Keying). All of the foregoing methods encode data into AC waveforms for transmission.

The present invention overcomes the data transfer rate limitations of the prior art encoding systems, and provides a system for encoding multiple data bits in parallel as transitions between discrete levels. This encoding system will substantially increase the data transfer rate and conserve bandwidth within a medium which is capable of supporting discrete levels.

SUMMARY OF THE INVENTION

According to the present invention, there is provided a method for encoding data that includes the steps of receiving a plurality of input values to be encoded, wherein each input value may be one of N different input values; establishing at least N+1 output levels, and transitioning from one of said at least N+1 output levels to another of said at least N+1 output levels, each transition representing one of the N different input values.

According to another aspect of the present invention, there is provided a system for encoding data which comprises means for establishing at least N+1 output levels, wherein each transition from one output level to another output level represents an encoded input value; means for receiving a plurality of input values to be encoded, wherein each of the input values may be one of N different input values; and means for transitioning from one of the at least N+1 output levels to another of the at least N+1 output levels for each consecutively received input value.

According to another aspect of the present invention, there is provided a method for encoding and decoding data that includes the steps of establishing N+1 voltage levels, wherein each transition from one voltage level to another voltage level represents an encoded input value; receiving a plurality of input values to be encoded, wherein each input value is one of N different input values, which represent $\log_2(N)$ bits; transitioning from one of the N+1 voltage levels to another of the N+1 voltage levels for each consecutively received input value; and decoding the output level into an input value according to a set of rules determined by both the output level currently being decoded and one or more output levels previously decoded.

According to another aspect of the present invention, there is provided a system for decoding data comprised of transition detection means for detecting a transition from a first of N+1 output levels to a second of N+1 output levels; decoding means for decoding an output level to an input value in response to the detection of a transition from the first of N+1 output levels to the second of N+1 output levels, which decodes the output level to the input value in accordance with the output level currently being decoded and at least one of the output levels previously decoded; and storage means for storing the input value decoded by the decoding means.

It is an object of the present invention to provide a data encoding system which achieves greater data transfer rates, without using higher clocking rates to carry the data.

It is another object of the present invention to provide a data encoding system which uses bandwidth more efficiently.

It is yet another object of the present invention to provide a data encoding system which encodes a series of multiple data bits into a series of voltage levels.

It is still another object of the present invention to provide a data encoding system which encodes a series of N input values (base N+1) into a series of transitions between one of N+1 or more voltage levels.

It is still another object of the present invention to provide a data encoding system which transmits the encoded data using a waveform which is inherently self-synchronizing, where transitions from one level to another level indicate that there is data to be decoded.

It is yet another object of the present invention to provide a system for decoding multi-level encoded data.

It is yet another object of the present invention to provide a data decoding system which decodes a series of N+1 or more voltage levels into N possible data values equaling the original N input values prior to encoding.

It is yet another object of the present invention to provide a data decoding system which does not require an external clocking signal for synchronization with an encoded waveform.

It is yet another object of the present invention to provide a data decoding system which self-synchronizes a decoder with an encoded waveform by reference to state transitions within a waveform, such as changes from one voltage level to another.

It is still another object of the present invention that allows for easy implementation of various error detection and correction methods by using more than N+1 output levels, and transitions thereof.

These and other objects will become apparent from the following description of a preferred embodiment taken together with the accompanying drawings and the appended claims.

BRIEF DESCRIPTION OF THE DRAWINGS

The above-mentioned and other features and objects of the invention and the manner of attaining them will become more apparent and the invention will be best understood by reference to the following description of an embodiment of the invention taken in conjunction with the accompanying drawings and appended claims, wherein:

FIG. 8 is a block diagram of the hardware arrangement for implementing the encoding algorithm according to a preferred embodiment of the present invention; and FIG. 9 is a block diagram of the hardware arrangement for implementing the decoding algorithm according to a preferred embodiment of the present invention.

DETAILED DESCRIPTION OF THE PREFERRED EMBODIMENT

Figure 1:
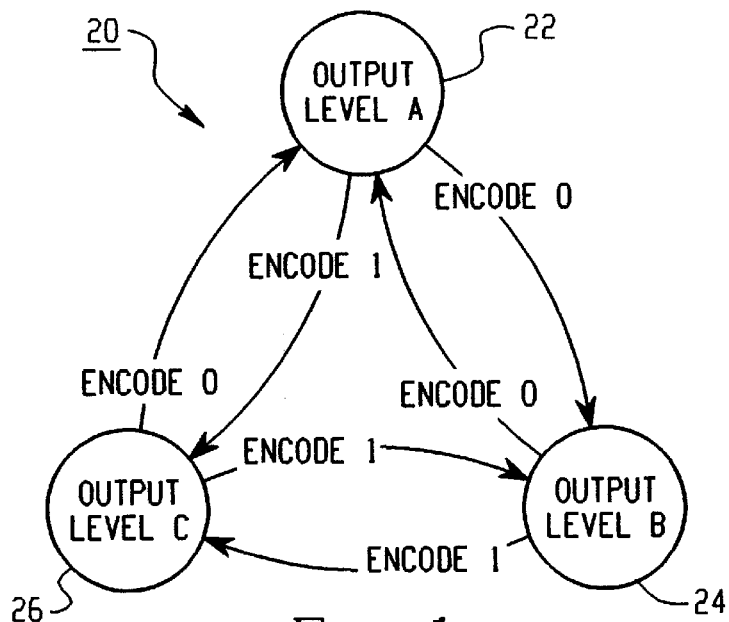
FIG. 1 is a state diagram for encoding two different input values into three output levels, according to a preferred embodiment of the present invention.

The present invention is directed to a system for encoding N input values into at least N+1 output levels. In a preferred embodiment of the present invention, each output level is represented by a different voltage. However, it should be appreciated that each output level may also be represented by a different frequency, phase, or amplitude. Referring now to the drawings wherein the showings are for the purpose of illustrating a preferred embodiment of the invention only, and not for the purpose of limiting same, FIG. 1 shows a state diagram 20 illustrating the transition between states for encoding two different input values (i.e., "0" and "1") into three output levels (i.e., output levels A, B and C), according to a preferred embodiment of the present invention. For instance, beginning at state 22 (output level A), if the next input value is a "0," the system transitions to state 24 (output level B). In contrast, if the next input value is a "1," the system transitions to state 26 (output level C). The system will transition from one state to one of the other two remaining states as each consecutive input value is encoded. Importantly, it should be noted that no two consecutive input values will be encoded as the same output level.

Figure 2:
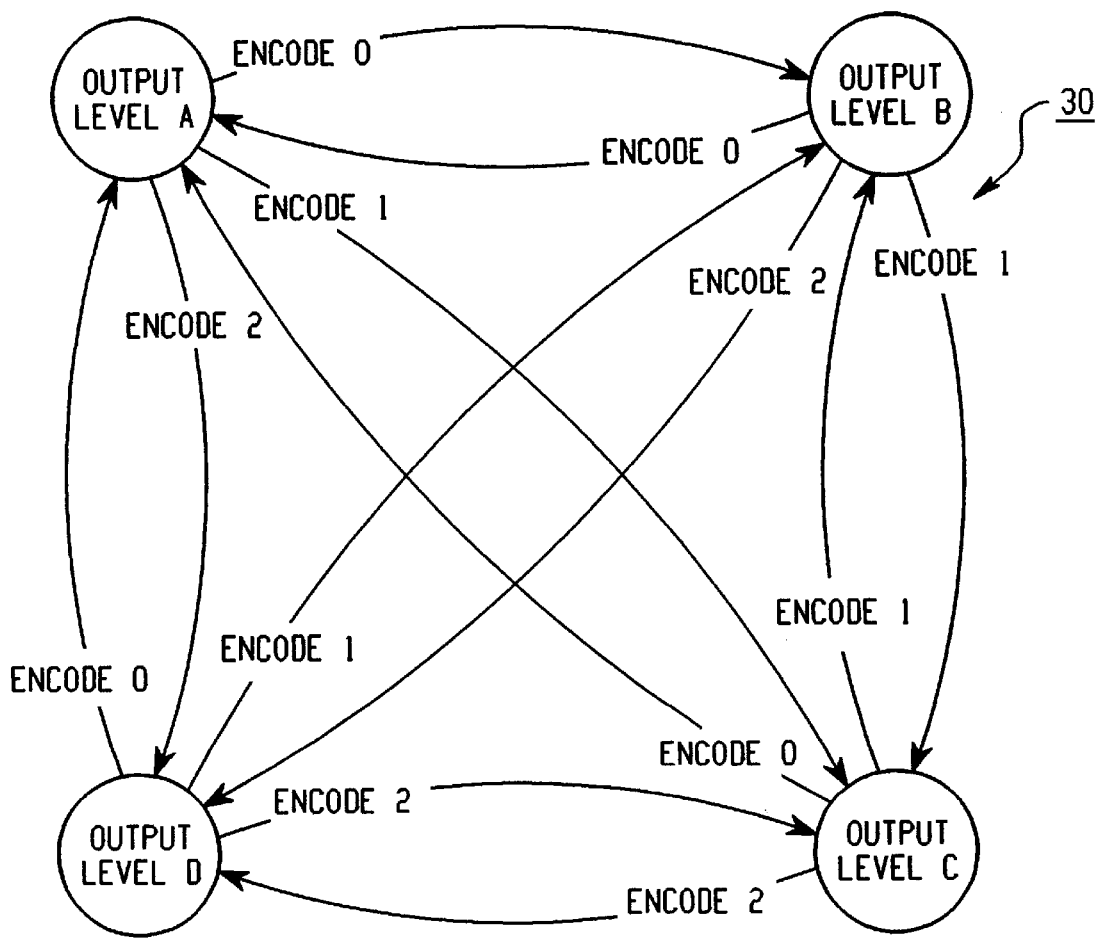
FIG. 2 is a state diagram for encoding three different input values into four output levels, according to a preferred embodiment of the present invention.

FIG. 2 shows a state diagram 30 illustrating the transition between states for encoding three input values (i.e., "0," "1" and "2") into four output levels (i.e., output levels A, B, C and D), according to a preferred embodiment of the present invention.

Figure 3:
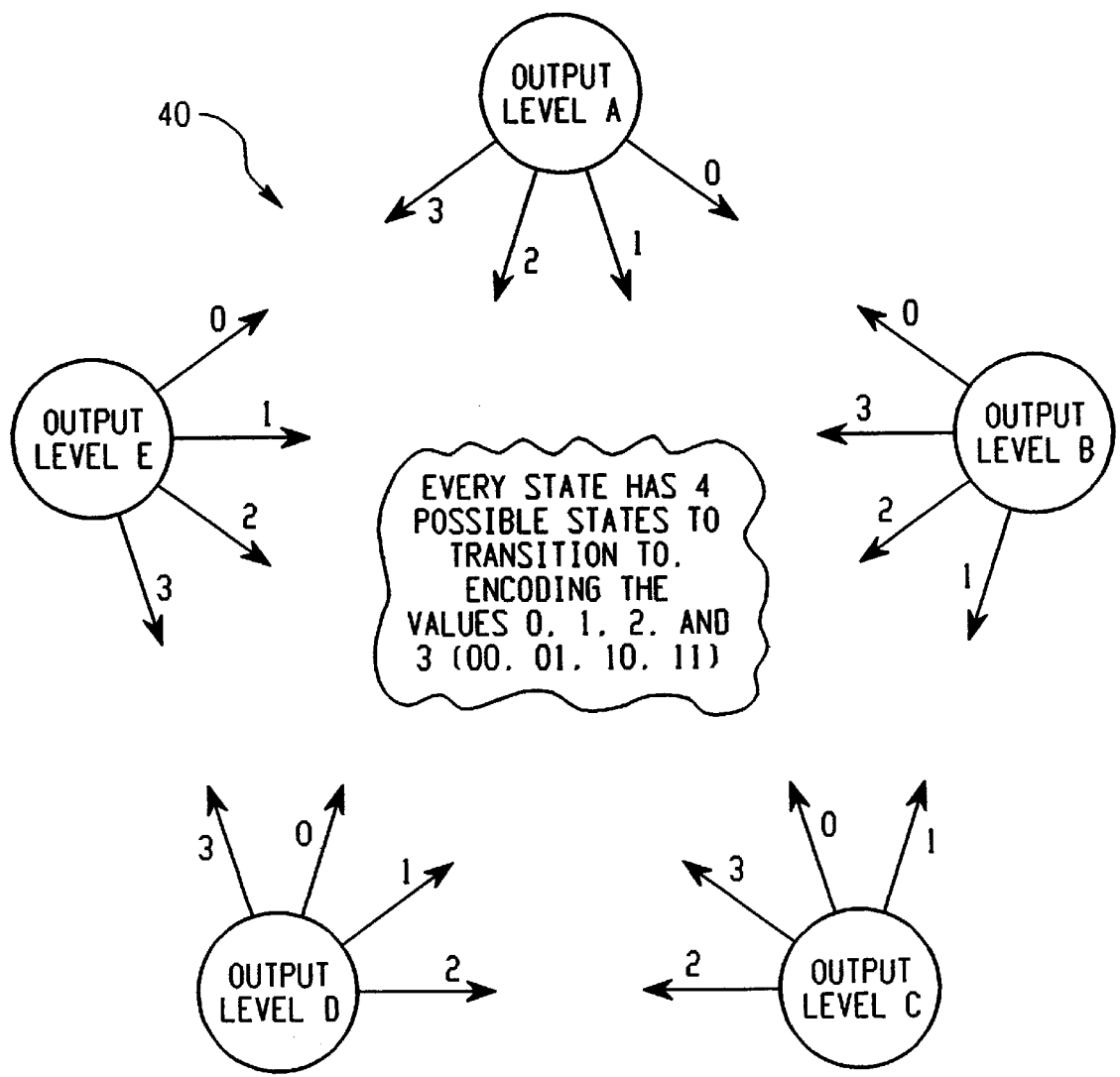
FIG. 3 is a state diagram for encoding four different input values into five output levels, according to a preferred embodiment of the present invention.

FIG. 3 shows a state diagram 40 illustrating the transitions between states for the encoding of four input values (i.e., "0," "1," "2" and "3") into five output levels (i.e., output levels A, B, C, D and E), according to a preferred embodiment of the present invention. It should be appreciated that since there are four input values, each input value may represent a bit pair (i.e., "00," "01," "10," and "11"). Therefore, each output level will represent two bits, rather than one bit, as in conventional encoding systems. Moreover, where N different input values are encoded into at least N+1 output levels, each input value can represent $\log_2(N)$ bits. As a result of using a single input value to represent a plurality of bits, higher data transfer rates are achievable, and bandwidth can be conserved. It should be appreciated that while in a preferred embodiment of the present invention the input values encode base 2 data (i.e., $\log_2(N)$ bits) the input values may also encode base X data. Therefore, the input values may represent values O through X-1 in base X with the encoded output having at least X different output levels. It should also be understood that there may be more than N+1 output levels and transitions thereof for encoding N different input values. This allows for simplified implementation of various error detection and correction methods.

Figure 4:
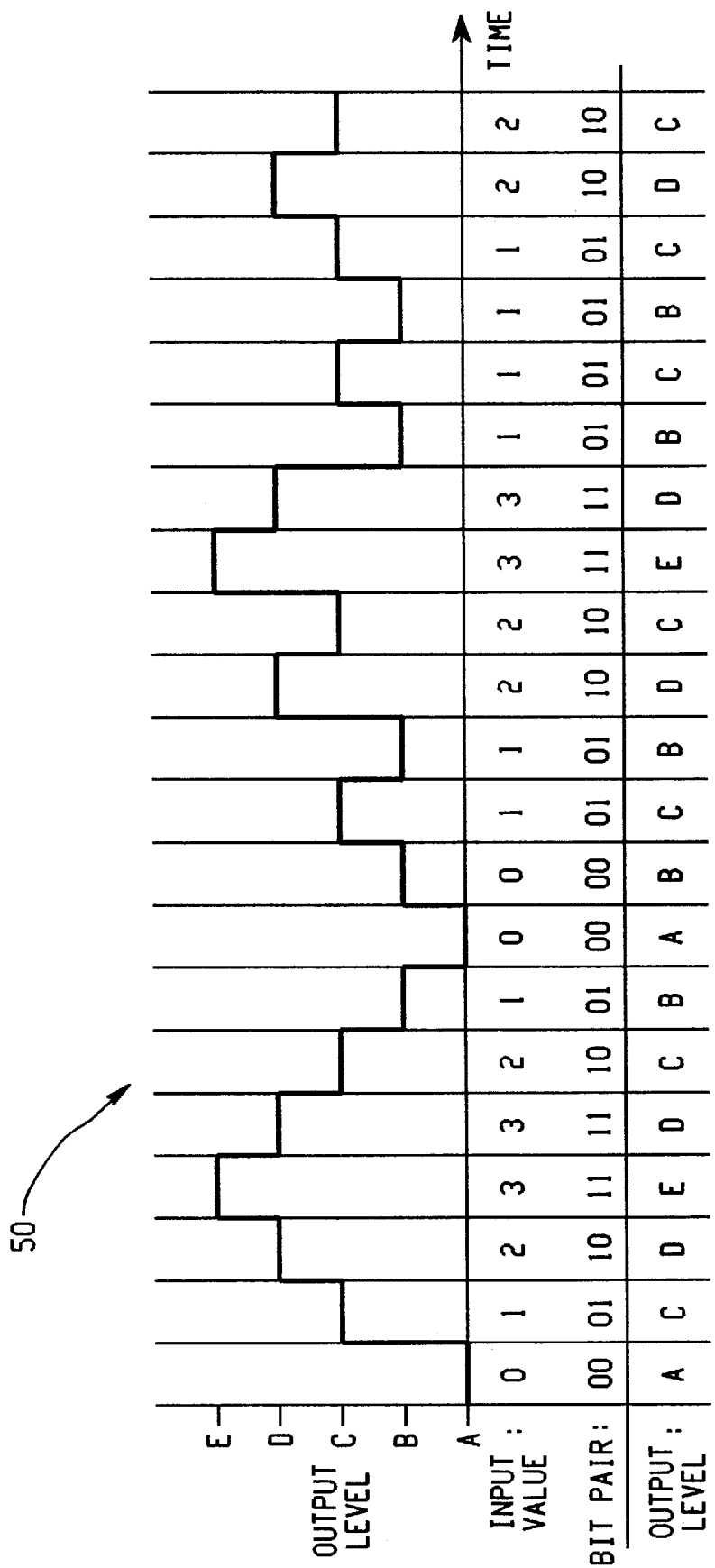
FIG. 4 is a timing diagram illustrating the encoding of four different input values according to the state diagram shown in FIG. 3.

A detailed description of the present invention as applied to the encoding of four input values into five output levels, will now be described with reference to FIGS. 4 and 5. FIG. 4 provides a timing diagram 50 which shows the transition of the output levels as each input value is encoded. It should be appreciated that in the embodiment shown in FIG. 4, each input value represents a bit pair. For the purpose of illustration, input value "0" represents bit pair "00," input value "1" represents bit pair "01," input value "2" represents bit pair "10" and input value "3" represents bit pair "11." As can be seen from FIG. 4, each consecutive output level will be different. Each output level A thru E is a discreet voltage level. For instance, output levels A thru E may correspond to voltages in the range of 0 to 5 volts.

Figure 5:
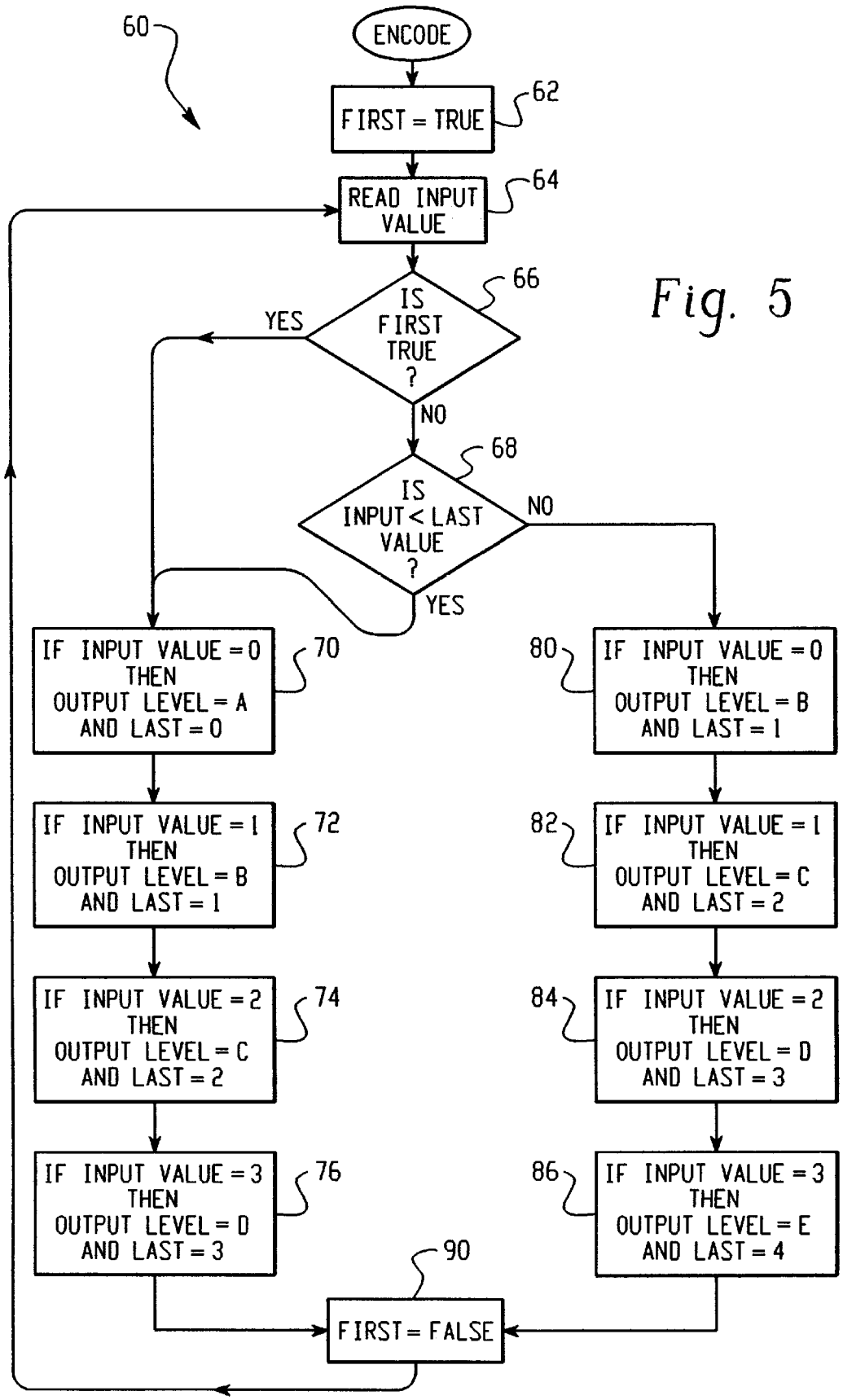
FIG. 5 is a flow chart illustrating a preferred embodiment of the algorithm for encoding the input values according to the state diagram shown in FIG. 3.

The input values shown in FIG. 4 are encoded into output levels A thru E according to the algorithm shown in flow chart 60 of FIG. 5. Beginning with step 62, a FIRST flag is set to TRUE. This will indicate that this is the first input value to be encoded. At step 64, an input value will be read in. Next, at step 66, it is determined whether the input value is the first input value to be encoded, by determining the status of the FIRST flag. If the input value is the first input value to be encoded, a first set of rules (steps 70–76) will be applied. If the input value is not the first input value to be encoded, it will be determined whether a second set of rules (steps 80–86) should be applied, as will be discussed below. For instance, in FIG. 4, the first input value is a "0" (corresponding to bit pair "00"). Accordingly, the conditions exist for applying the first set of rules. In particular, step 70 will be executed. En this respect, the output level will be set to A and the LAST variable will be set to "0." The LAST variable is used as a reference value to determine the appropriate set of rules to be applied following the first input value, as will be described below in connection with step 68.

It should be understood that only one of the steps 70–76 will be valid when applying the first set of rules. Accordingly, step 90 will follow step 70. Step 90 sets the FIRST flag to FALSE for the subsequent input values. The algorithm then returns to step 64 to read in the next input value. In FIG. 4, the next consecutive input value is a "1." Since the FIRST flag is now set to FALSE, the algorithm will proceed from step 66 to step 68. At step 68, it is determined whether the input value is less than the LAST variable. This step determines whether the first set of rules (steps 70–76) should be applied or whether the second set of rules (steps 80–86) should be applied. In the present example, the input value of "1" is greater than the LAST variable, which has been previously set to "0" at step 70. Therefore, the algorithm will apply the second set of rules (steps 80–86). Since the input value is "1," step 82 will be executed. Step 82 sets the output level to C and the LAST variable to 2. The algorithm then proceeds to step 90 and returns again to step 64 for reading in the next consecutive input value. The algorithm will continue in this manner until all of the input values have been encoded as output levels.

With reference to FIG. 4, it should be appreciated that the output level of the preceding encoded input value will determine the output level for the next consecutive encoded input value. In particular, the next consecutive input value will be encoded as one of the four remaining output levels. As a result, when two consecutive input values are the same, such as the consecutive 3's following the first three input values in FIG. 4, each of the 3's will be encoded as different output levels. In the case of the first "3," the output level is E, whereas the second 3 is encoded as output level D. Since no consecutive output level will be the same, the output levels will transition for each consecutive encoded input value.

Figure 6:
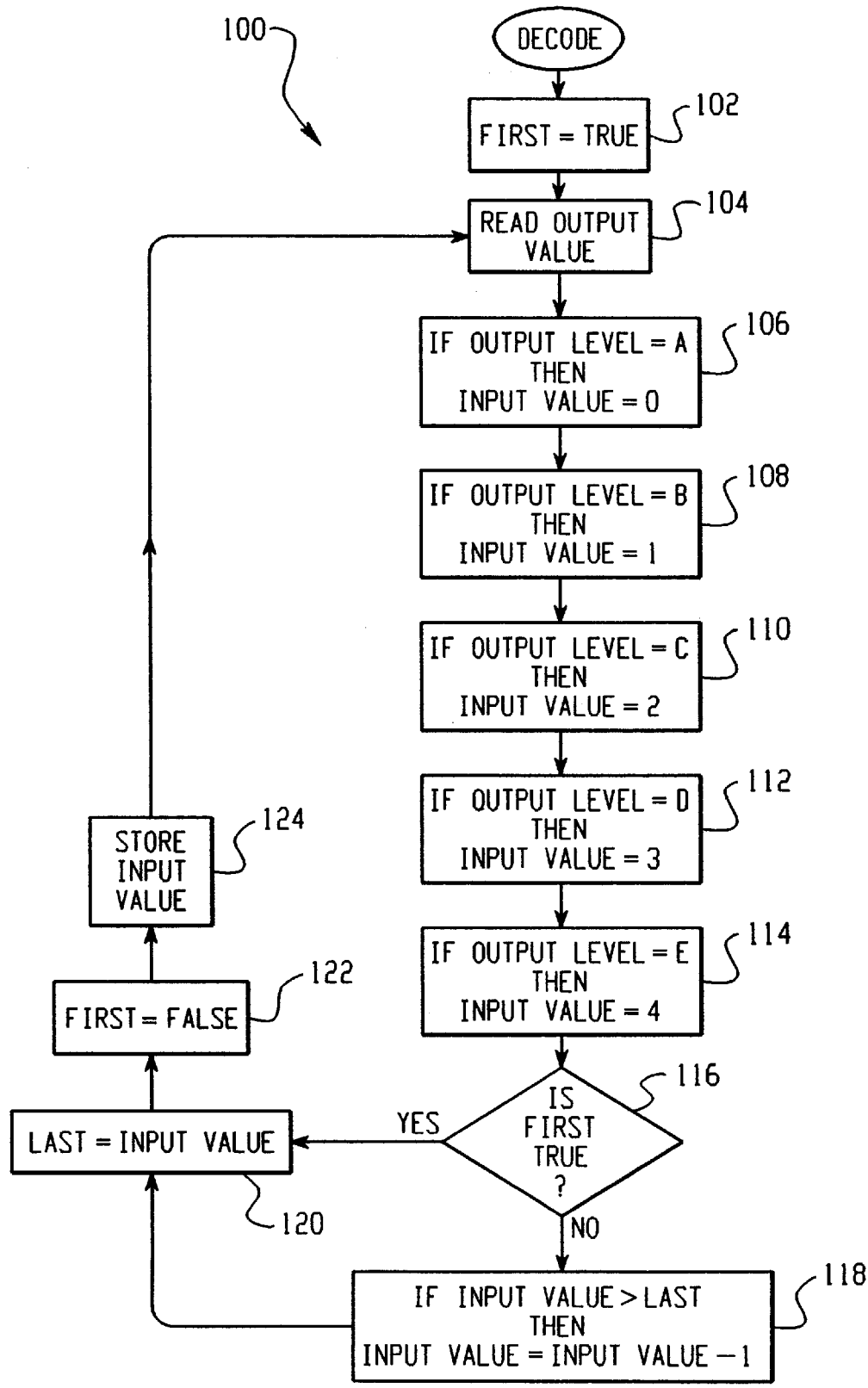
FIG. 6 is a flow chart illustrating a preferred embodiment of the algorithm for decoding output levels into input values.

Referring now to FIG. 6, there is shown a flow chart 100 which illustrates an algorithm for decoding output levels back into input values, according to a preferred embodiment of the present invention. Beginning with step 102, the FIRST flag is set to TRUE indicating that this is the first output level to be decoded. At step 104, the output level is read in. For steps 106–114, an input value is determined based upon the output level read in. However, in some cases this input value will be modified, as will be explained below in connection with step 118. Therefore, the decoded input value will be determined based upon a set of rules determined by both the current output level and one or more prior output levels. If the output level is the first output level read in (i.e., FIRST= TRUE), then the input value is not modified. In this respect, the algorithm will proceed from step 116 to step 120 where the LAST variable will be set to the input value. It should be appreciated that the LAST variable is used to determine if an input value needs to be modified, as will be explained in connection with step 118. Proceeding next to step 122, the FIRST flag is set to FALSE for reading subsequent output levels. At step 124, the input value is stored. The algorithm now returns to step 104, to read in the next consecutive output level. After evaluating the output level at steps 106–114, if the FIRST flag is no longer true (step 116), the algorithm proceeds to step 118. At step 118, it is determined whether the input value (obtained at one of the steps 106–114) is greater than the LAST variable. If so, the input value is modified by decrementing it by one. If the input value is not greater than the LAST variable, then the input value is not modified. The algorithm then proceeds to step 120, where the LAST variable is set equal to the present input value, and step 122. At step 124, the input value is stored. The algorithm then returns to step 104 to read in the next consecutive output level. The algorithm will continue in this manner until all of the output levels have been decoded back to the original input values.

As noted above, each consecutive output level in the encoded waveform will be different, and thus necessitate a transition. As a result, the decoding system will not require an external clocking signal to synchronize with the encoded waveform. In this regard, the decoding system is self-synchronizing with the encoded waveform by using the transition of each consecutive output level as the indicator that a new output level has been received for decoding. Thus, the decoder can be easily synchronized with an encoded waveform having a variable transmission speed.

It should be understood that while FIGS. 4–6 show the implementation of only five output levels, the number of output levels may be significantly greater. As a result, the number of different input values may also be significantly greater. By increasing the number of output levels and input values, the number of bits represented by each input value can also be increased. Accordingly, as noted above, the present invention can be used to substantially increase the data transfer rate and conserve bandwidth.

Figure 7:
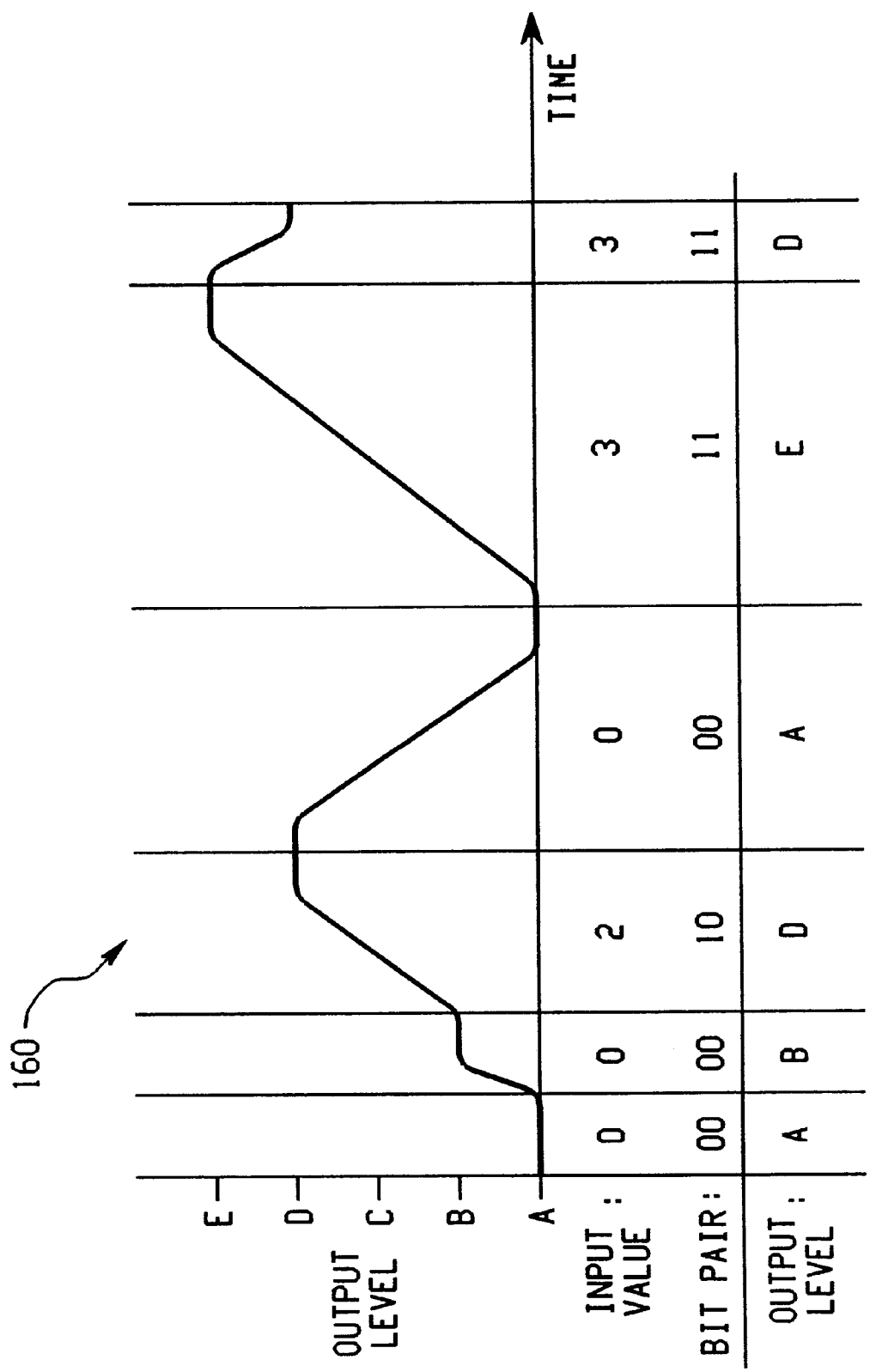
FIG. 7 is a timing diagram illustrating the encoding of four different input values.

It should also be appreciated that FIGS. 4–6 illustrate a fixed timing relationship between one output level and the next solely for the purpose of illustrating the present invention. In this regard, the time scale itself is completely arbitrary, and the time required to transition from one output level to another is also completely arbitrary. Accordingly, it should be understood that the present invention can maximize the use of available bandwidth by varying the timing relationship from one transition to another. For example, in a bandwidth limited transmission medium, a change from one output level to a nearby output level, such as from A to B, will stabilize quickly, whereas a change from one output level to a distant output level, such as from A to E, will take longer to stabilize. Therefore, small changes can be transmitted more quickly. FIG. 7 provides a timing diagram 160 which shows the timing where stabilization of the transitions varies depending upon the relative difference between consecutive output levels. As can be seen from the diagram, the time for a single level change (e.g., A to B) takes approximately half the time needed for a change of two levels (e.g., B to D).

Referring now to FIG. 8, there is shown a block diagram of a hardware arrangement 130 for encoding input values into output level transitions. Arrangement 130 is generally comprised of a buffer 132, encoding logic 134, and a digital-to-analog converter 136. In a preferred embodiment of the present invention, buffer 132 is a FIFO chip for buffering the received data. For instance, buffer 132 may take the form of a Cyprus Semiconductor CY7C464. Encoding logic 134 is programmed to implement the algorithm in the manner as described in connection with FIG. 5. In a preferred embodiment of the present invention, encoding logic 134 takes the form of an EPLD device, such as the Altera EPM7096S. Digital-to-analog converter 136 may take the form of an 8-bit video DAC, such as the Phillips TDA8702.

Arrangement 130 operates in the following manner. Unencoded data is stored in buffer 132. The unencoded data are input values which may represent one or more bits. Encoding logic 134 reads out the unencoded data and encodes it into output levels transitions which are sent to digital-to-analog converter 136. It should be appreciated that the analog coded data may be transmitted using a variety of different mediums, including a television signal. For instance, encoded data may be transmitted during the active video portion of the television signal. Accordingly, large quantities of data can be quickly and conveniently transferred.

Referring now to FIG. 7, there is shown a block diagram of hardware arrangement 150 for decoding output levels transitions into input values. Arrangement 150 is generally comprised of an analog-to-digital converter 152, a buffer 154 and decoding logic 156. Analog-to-digital converter 152 is preferably an 8-bit video ADC, such as Phillips TDA8708B. In a preferred embodiment of the present invention, buffer 154 is a FIFO chip for buffering the digital data. For instance, buffer 154 may take the form of a Cyprus Semiconductor CY7C464. Decoding logic 156 is programmed to implement the algorithm in the manner as described in connection with FIG. 6. In a preferred embodiment of the present invention, decoding logic 156 takes the form of an EPLD device, such as the Altera EPM7096S.

Arrangement 150 operates in the following manner. Analog-to-digital converter 152 receives the encoded output levels and converts them to digital data. Buffer 154 stores the digital data. Decoding logic 156 reads out the digital data from buffer 154 and decodes the encoded output level transitions into input values. These input values in turn may be converted to one or more bits.

It should be appreciated that arrangements 130 and 150, as described above, are provided solely for the purpose of illustrating a preferred embodiment of the present invention and that numerous other arrangements are suitable as well.

The foregoing description is a specific embodiment of the present invention. It should be appreciated that this embodiment is described for purposes of illustration only, and that numerous alterations and modifications may be practiced by those skilled in the art without departing from the spirit and scope of the invention. In this regard, it is known that large changes between consecutive output levels may generate significant noise, and thus require increased bandwidth. As a result, it might be necessary in some cases to limit the changes between consecutive output levels to the nearest 50 percent of the available output levels. Therefore, there may be more than N+1 output levels for encoding N input values. For instance, an encoder having ten output levels might produce a step of one of four levels per each transition, encoding two bits at a time, but reducing the needed bandwidth of the channel. It is intended that all such modifications and alterations be included insofar as they come within the scope of the invention as claimed or the equivalents thereof.

The invention claimed is:

1. A method for encoding data comprising:

receiving a plurality of input values to be encoded, wherein each of the input values is a number in the range of 0 to N−1 in base N, where N≧3;

establishing at least N+1 output levels, each said transition in output level representing an encoded input value; and transitioning from one of said at least N+1 output levels to another of said at least N+1 output levels for each consecutively received input value, wherein each consecutive output level is different, and wherein the frequency of transitions between output levels varies in accordance with the relative difference between consecutive output levels.

2. A method according to claim 1, wherein each said number represents $\log_2(N)$ bits.

3. A method according to claim 1, wherein said output levels are one of the following:

voltage levels, frequencies, phases or amplitudes.

4. A method according to claim 1, wherein each of said input values is associated with a reference value during encoding thereof.

5. A method according to claim 4, wherein if said input value is the first input value to be encoded or if said input value is less than said reference value associated with the previously encoded input value, then said input value is encoded according to a first set of rules, otherwise said input value is encoded according to a second set of rules, said first and second set of rules establishing the appropriate transition among said output levels.

6. A system for encoding data comprising:

means for establishing at least N+1 output levels, each transition in said output level representing an encoded input value;

means for receiving a plurality of input values to be encoded, wherein each said input value is a number in the range of 0 to N−1 in base N, where N≧3;

means for transitioning from one of said at least N+1 output levels to another of said at least N+1 output levels for each consecutively received input value, wherein each consecutive output level is different, and wherein the frequency of transitions between output levels varies in accordance with the relative difference between consecutive output levels.

7. A system according to claim 6, wherein each said number represents $\log_2(N)$ bits.

8. A system according to claim 6, wherein said system further comprises means for decoding each of said output levels into an input value according to a set of rules determined by both the output level currently being decoded and one or more output levels previously decoded.

9. A method for encoding and decoding data comprising:

establishing N+1 output levels, each transition between said output levels representing an encoded input value, where N≧3;

receiving a plurality of input values to be encoded, wherein each said input value is a number in the range of 0 to N−1 in base N;

transitioning from one of said N+1 output levels to another of said N+1 output levels for each consecutively received input value, wherein each consecutive output level is different, and wherein the frequency of transitions between output levels varies in accordance with the relative difference between consecutive output levels; and decoding said output level into an input value according to a set of rules determined by both the output level currently being decoded and one or more output levels previously decoded.

10. A method according to claim 9, wherein each said number is representative of $\log_2(N)$ bits.

11. A system for decoding data comprising:

transition detection means for detecting a transition from a first of N+1 output levels to a second of N+1 output levels, where N≧3, wherein each consecutive output level is different, and the frequency of transitions between output levels varies in accordance with the relative difference between consecutive output levels;

decoding means for decoding an output level to an input value in response to the detection of a transition from the first of N+1 output levels to the second of N+1 output levels, wherein each input value is a number in the range of 0 to N−1 in base N, said decoding means decoding the output level to the input value in accordance with the output level currently being decoded and at least one of the output levels previously decoded; and storage means for storing the input value decoded by said decoding means.

12. A method for encoding data comprising:

receiving a plurality of input values to be encoded, wherein each of the input values may be one of N different input values;

establishing at least N+1 output levels, each said transition in output level representing an encoded input value; and transitioning from one of said at least N+1 output levels to another of said at least N+1 output levels for each consecutively received input value, each consecutive output level being different, wherein the time between initiation of consecutive transitions varies in accordance with the relative difference between consecutive output levels.

13. A method according to claim 12, wherein each said N different input values is a number in the range of 0 through N in base N+1, where N≧3.

14. A method according to claim 13, wherein each said number represents $\log_2(N)$ bits.

15. A method according to claim 12, wherein said output level takes the form of one of the following:

voltage levels, frequencies, phases or amplitudes.

* * * * *